United States Patent
Lee

(10) Patent No.: US 12,519,352 B2
(45) Date of Patent: Jan. 6, 2026

(54) MOTOR WITH FAN-SHAPED ROTATING PIECES AND STATIONARY ENERGIZING COIL

(71) Applicant: Sentelic Corporation, Taipei (TW)

(72) Inventor: Wen-Ting Lee, Taipei (TW)

(73) Assignee: Sentelic Corporation, Taipei (TW)

( * ) Notice: Subject to any disclaimer, the term of this patent is extended or adjusted under 35 U.S.C. 154(b) by 229 days.

(21) Appl. No.: 18/480,518

(22) Filed: Oct. 4, 2023

(65) Prior Publication Data

US 2025/0038592 A1 Jan. 30, 2025

(30) Foreign Application Priority Data

Jul. 25, 2023 (TW) ................................. 112127803

(51) Int. Cl.
H02K 1/24 (2006.01)
(52) U.S. Cl.
CPC ...................................... H02K 1/24 (2013.01)
(58) Field of Classification Search
CPC .......... H02K 1/24; H02K 1/243; H02K 3/325; H02K 3/525; H02K 3/528; H02K 3/46; H02K 3/527; H02K 21/048; H02K 21/42; H02K 16/04
USPC ............................ 310/46, 67 A, 156.66, 263
See application file for complete search history.

(56) References Cited

U.S. PATENT DOCUMENTS

| | | | | |
|---|---|---|---|---|
| 3,663,846 A | * | 5/1972 | Wagner | H02K 1/243 |
| | | | | 310/263 |
| 2003/0178909 A1 | * | 9/2003 | Kusase | H02K 19/26 |
| | | | | 310/181 |
| 2008/0238265 A1 | | 10/2008 | Matsubara | |
| 2015/0236557 A1 | | 8/2015 | Nakamasu et al. | |
| 2017/0288515 A1 | * | 10/2017 | Jeung | H02K 1/246 |

FOREIGN PATENT DOCUMENTS

| | | | | |
|---|---|---|---|---|
| DE | 102012217221 A1 | * | 3/2014 | ........... H02K 21/048 |
| EP | 1727262 A2 | | 11/2006 | |
| TW | 1467893 B | | 1/2015 | |
| TW | 1646757 B | | 1/2019 | |
| WO | 2019155958 A1 | | 8/2019 | |

OTHER PUBLICATIONS

Machine translation of DE-102012217221-A1 (Year: 2012).*

* cited by examiner

*Primary Examiner* — Michael Andrews
(74) *Attorney, Agent, or Firm* — CKC & Partners Co., LLC

(57) ABSTRACT

A motor rotor includes a stationary portion, a coil and a rotating portion. The stationary portion has a first surface, a second surface surrounding the first surface and a space communicated between the first surface and the second surface. The coil locates in the space. The rotating portion includes some first fan-shaped rotating pieces and some second fan-shaped rotating pieces. Each first rotating piece has a first short edge, a first long edge opposite to the first short edge and a first corresponding surface adjacent to the first short edge and aligning with the first surface. The second fan-shaped rotating pieces and the first fan-shaped rotating pieces are alternately arranged. Each second rotating piece has a second short edge, a second long edge opposite to the second short edge and a second corresponding surface adjacent to the second short edge and aligning with the second surface.

16 Claims, 9 Drawing Sheets

MOTOR WITH FAN-SHAPED ROTATING PIECES AND STATIONARY ENERGIZING COIL

RELATED APPLICATIONS

Technical Field

This application claims priority to Taiwanese Application Serial Number 112127803 filed Jul. 25, 2023, which is herein incorporated by reference.

BACKGROUND

Technical Field

The present disclosure relates to motor rotors.

Description of Related Art

With the continuous improvement of living standards of people, the demand for mechanical equipment from different aspects is also increasing. Facing to the huge market, in order to enhance the competitiveness of their own brands, various manufacturers are working hard to improve the design of mechanical equipment.

It is well known that, in different mechanical equipment, the motor is one of the major components. Therefore, the way to effectively improve the functional performance of the motor is undoubtedly an important issue that the industry highly concerns.

SUMMARY

A technical aspect of the present disclosure is to provide a motor rotor, which can allow a user to control the torque and the rotating speed in a simple and easy manner.

According to an embodiment of the present disclosure, a motor rotor includes a stationary portion, a coil and a rotating portion. The stationary portion has a space, a first annular surface and a second annular surface. The second annular surface surrounds and is separated from the first annular surface. The space is communicated between the first annular surface and the second annular surface. The coil is at least partially located in the space. The rotating portion is configured to rotate about an axis relative to the stationary portion. The rotating portion includes a plurality of first fan-shaped rotating pieces and a plurality of second fan-shaped rotating pieces. Each of the first fan-shaped rotating pieces has a first corresponding surface, a first short edge and a first long edge opposite to the first short edge. The first short edge is closer to the axis than the first long edge to the axis. The first corresponding surface is adjacent to the first short edge. The first corresponding surface faces to and at least partially aligns with the first annular surface. The second fan-shaped rotating pieces are alternately arranged with the first fan-shaped rotating pieces around the axis. Each of the second fan-shaped rotating pieces has a second corresponding surface, a second short edge and a second long edge opposite to the second short edge. The second short edge is closer to the axis than the second long edge to the axis. The second corresponding surface is adjacent to the second short edge. The second corresponding surface faces to and at least partially aligns with the second annular surface.

In one or more embodiments of the present disclosure, the first fan-shaped rotating pieces and the second fan-shaped rotating pieces are separated from each other.

In one or more embodiments of the present disclosure, the first corresponding surfaces are separated from the first annular surface. The second corresponding surfaces are separated from the second annular surface.

In one or more embodiments of the present disclosure, each of the first long edges has a first length. Each of the second long edges has a second length. The first length is equal to the second length.

In one or more embodiments of the present disclosure, the rotating portion further includes a non-magnetic element. The non-magnetic element is connected with the first fan-shaped rotating pieces and the second fan-shaped rotating pieces.

In one or more embodiments of the present disclosure, the stationary portion includes an outer columnar tube, an inner columnar tube and a plate. The outer columnar tube extends along the axis. The outer columnar tube has a first end and a second end opposite to the first end. The second annular surface is located on the first end. The inner columnar tube extends along the axis. The inner columnar tube has a third end and a fourth end opposite to the third end. The first annular surface is located on the third end. The inner columnar tube is located inside the outer columnar tube. The inner columnar tube and the outer columnar tube define the space therebetween. The plate is connected between the second end and the fourth end.

In one or more embodiments of the present disclosure, the rotating portion further includes a first annular piece. The first annular piece aligns with the first annular surface. The first corresponding faces are connected to a side of the first annular piece away from the first annular surface.

In one or more embodiments of the present disclosure, the first annular piece has a third annular surface. The third annular surface faces to and is separated from the first annular surface. An area of the third annular surface is equal to an area of the first annular surface.

In one or more embodiments of the present disclosure, the rotating portion further includes a second annular piece. The second annular piece surrounds the first annular piece and aligns with the second annular surface. The second corresponding faces are connected to a side of the second annular piece away from the second annular surface.

In one or more embodiments of the present disclosure, the second annular piece has a fourth annular surface. The fourth annular surface faces to and is separated from the second annular surface. An area of the fourth annular surface is equal to an area of the second annular surface.

According to an embodiment of the present disclosure, a motor rotor includes a stationary portion, a coil and a rotating portion. The stationary portion has a space, a first annular surface and a second annular surface. The second annular surface surrounds and is separated from the first annular surface. The space is communicated between the first annular surface and the second annular surface. The coil is at least partially located in the space. The rotating portion is configured to rotate about an axis relative to the stationary portion. The rotating portion includes a plurality of first fan-shaped rotating pieces and a plurality of second fan-shaped rotating pieces. The first fan-shaped rotating pieces respectively have a first corresponding surface facing to and at least partially aligning with the first annular surface. The second fan-shaped rotating pieces are alternately arranged with the first fan-shaped rotating pieces around the axis. Each of the second fan-shaped rotating pieces has a second corresponding surface facing to and at least partially aligning with the second annular surface. A quantity of the first fan-shaped rotating pieces being equal to a quantity of the second fan-shaped rotating pieces.

In one or more embodiments of the present disclosure, each of the first fan-shaped rotating pieces has a first short edge and a first long edge opposite to the first short edge. The first short edge is closer to the axis than the first long edge to the axis. Each of the first corresponding surfaces is adjacent to a corresponding one of the first short edges. Each of the second fan-shaped rotating pieces has a second short edge and a second long edge opposite to the second short edge. The second short edge is closer to the axis than the second long edge to the axis. Each of the second corresponding surfaces is adjacent to a corresponding one of the second short edges. The first long edges and the second long edges are located on a same circular locus.

In one or more embodiments of the present disclosure, each of the first long edges has a first length. Each of the second long edges has a second length. The first length is equal to the second length.

In one or more embodiments of the present disclosure, the first fan-shaped rotating pieces and the second fan-shaped rotating pieces are separated from each other.

In one or more embodiments of the present disclosure, the first corresponding surfaces are separated from the first annular surface. The second corresponding surfaces are separated from the second annular surface.

In one or more embodiments of the present disclosure, the rotating portion further includes a non-magnetic element. The non-magnetic element is connected with the first fan-shaped rotating pieces and the second fan-shaped rotating pieces.

In one or more embodiments of the present disclosure, the stationary portion includes an outer columnar tube, an inner columnar tube and a plate. The outer columnar tube extends along the axis and has a first end and a second end opposite to the first end. The second annular surface is located on the first end. The inner columnar tube extends along the axis and has a third end and a fourth end opposite to the third end. The first annular surface is located on the third end. The inner columnar tube is located inside the outer columnar tube. The inner columnar tube and the outer columnar tube define the space therebetween. The coil at least partially winds around the inner columnar tube. The plate is connected between the second end and the fourth end.

The above-mentioned embodiments of the present disclosure have at least the following advantages:

(1) Since the first corresponding surface of each of the first fan-shaped rotating pieces faces to and at least partially aligns with the first annular surface of the inner columnar tube, and the second corresponding surface of each of the second fan-shaped rotating pieces faces to and at least partially aligns with the second annular surface of the outer columnar tube, the portions of the magnetic flux of opposite polarities can be respectively guided to the first fan-shaped rotating pieces and the second fan-shaped rotating pieces, such that the first fan-shaped rotating pieces and the second fan-shaped rotating pieces possess opposite magnetisms and interact with the stator surrounding the rotating portion, causing the rotating portion to rotate relative to the stationary portion about the axis.

(2) Since the strength of the magnetic flux can be controlled by the electric current applied to the coil, when the rotating portion rotates relative to the stationary portion at a low speed, a user can increase the electric current flowing through the coil to enhance the magnetic flux, which also means to increase the magnetisms of the first fan-shaped rotating pieces and the second fan-shaped rotating pieces, so as to increase the torque of the rotating portion. On the contrary, when the rotating portion rotates relative to the stationary portion at a high speed, a user can decrease the electric current flowing through the coil to reduce the magnetic flux, which also means to decrease the magnetisms of the first fan-shaped rotating pieces and the second fan-shaped rotating pieces, so as to increase the rotating speed of the rotating portion.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
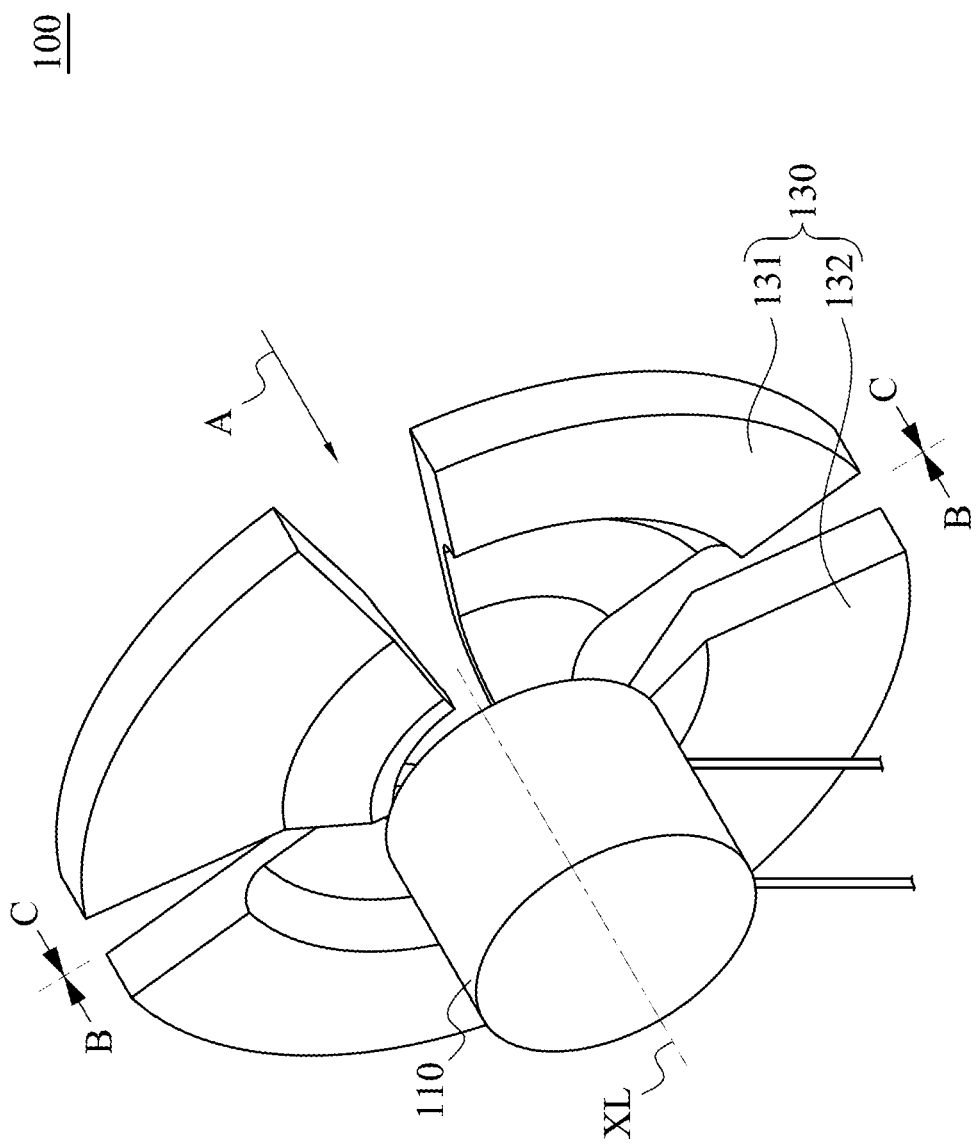
FIG. 1 is a schematic view of a motor rotor according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference is made to FIG. 1. FIG. 1 is a schematic view of a motor rotor 100 according to an embodiment of the present disclosure. For the sake of drawing simplification, the non-magnetic element 133 is not shown in FIG. 1. In this embodiment, as shown in FIG. 1, a motor rotor 100 includes a stationary portion 110 and a rotating portion 130 separated from the stationary portion 110. In practical applications, the motor rotor 100 is at least partially accommodated in a stator (not shown), and the rotating portion 130 is configured to interact with the stator, such that the rotating portion 130 rotates about an axis XL relative to the stationary portion 110.

Figure 2:
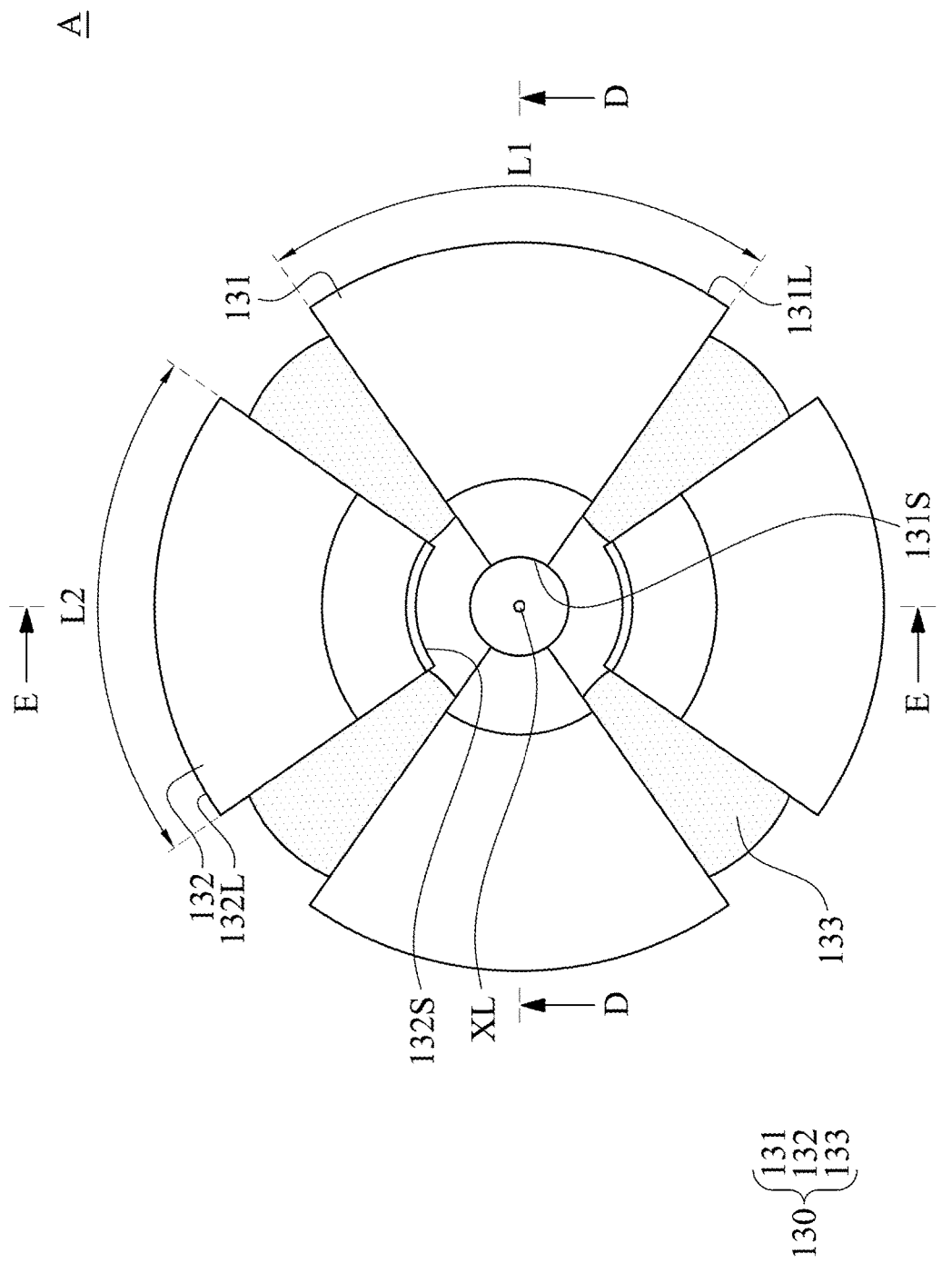
FIG. 2 is a front view along the arrow A in FIG. 1.

Reference is made to FIG. 2. FIG. 2 is a front view along the arrow A in FIG. 1. In this embodiment, as shown in FIG. 2, the rotating portion 130 includes a plurality of first fan-shaped rotating pieces 131 and a plurality of second fan-shaped rotating pieces 132. Each of the first fan-shaped rotating pieces 131 has a first short edge 131S and a first long edge 131L opposite to the first short edge 131S. The first short edge 131S is closer to the axis XL than the first long edge 131L to the axis XL. The second fan-shaped rotating pieces 132 are alternately arranged with the first fan-shaped rotating pieces 131 around the axis XL. Each of the second fan-shaped rotating pieces 132 has a second short edge 132S and a second long edge 132L opposite to the second short edge 132S. The second short edge 132S is closer to the axis XL than the second long edge 132L to the axis XL.

Moreover, as shown in FIG. 2, the first long edge 131L of each of the first fan-shaped rotating pieces 131 is curved in shape and has a first length L1. The second long edge 132L of each of the second fan-shaped rotating pieces 132 is also curved in shape and has a second length L2. In practical applications, the first length L1 of the first long edge 131L is equal to the second length L2 of the second long edge 132L.

It is worth to note that, in this embodiment, as shown in FIG. 2, the first fan-shaped rotating pieces 131 and the second fan-shaped rotating pieces 132 of the rotating portion 130 are separated from each other. In other words, the first fan-shaped rotating pieces 131 and the second fan-shaped rotating pieces 132 do not directly contact with each other.

Moreover, in this embodiment, the quantity of the first fan-shaped rotating pieces 131 is equal to the quantity of the second fan-shaped rotating pieces 132. For example, as shown in FIGS. 1-2, the quantity of the first fan-shaped rotating pieces 131 and the quantity of the second fan-shaped rotating pieces 132 are respectively two. In other embodiments, under the condition to maintain the alternate arrangement between the second fan-shaped rotating pieces 132 and the first fan-shaped rotating pieces 131 around the axis XL, the quantity of the first fan-shaped rotating pieces 131 and the quantity of the second fan-shaped rotating pieces 132 can be respectively designed to be three or more according to the actual situation.

Furthermore, in this embodiment, as shown in FIG. 2, the rotating portion 130 further includes a non-magnetic element 133. The non-magnetic element 133 is connected with the first fan-shaped rotating pieces 131 and the second fan-shaped rotating pieces 132, in order to fix the relative position between the first fan-shaped rotating pieces 131 and the second fan-shaped rotating pieces 132.

Figure 3:
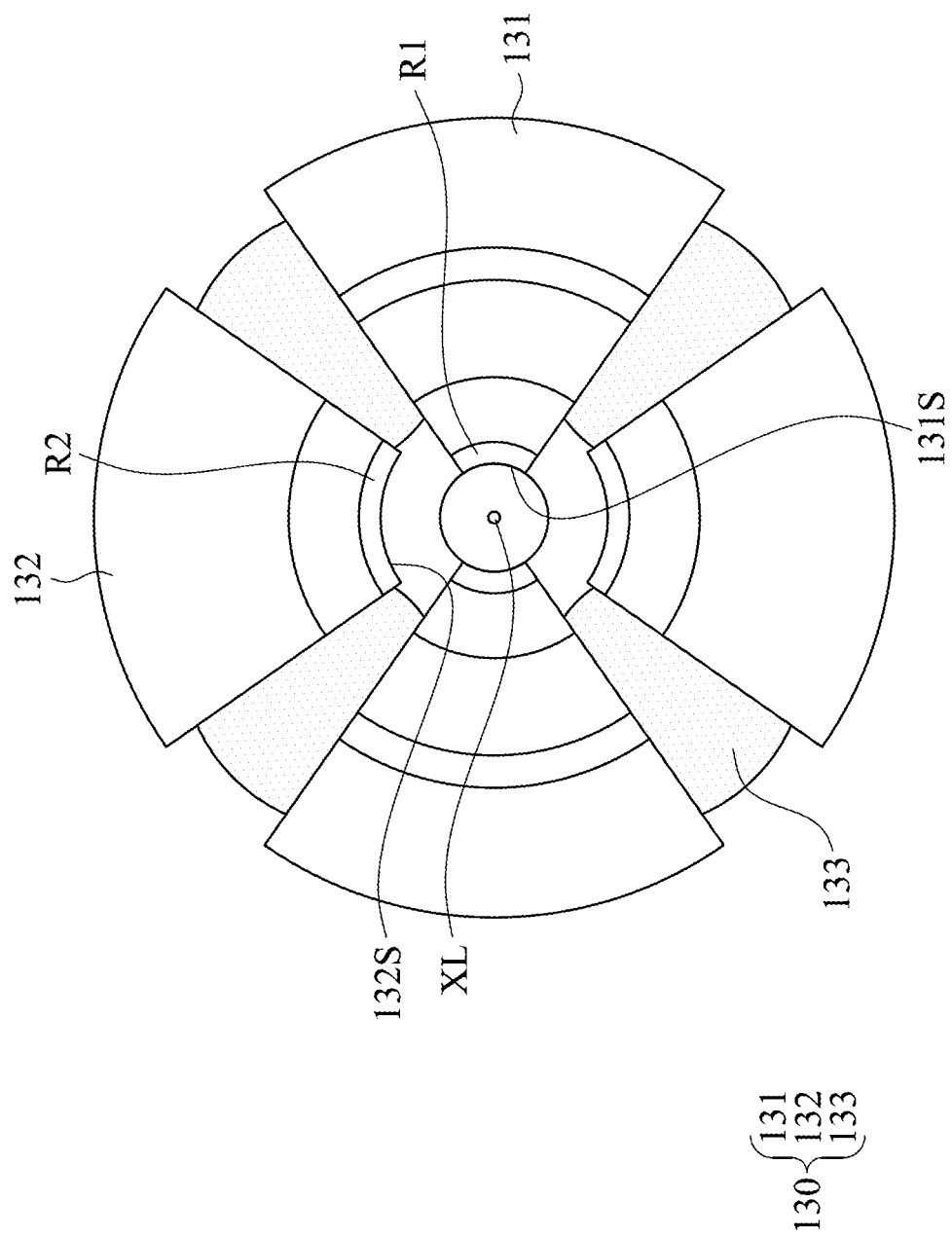
FIG. 3 is a cross-sectional view along the sectional line B-B in FIG. 1.

Reference is made to FIG. 3. FIG. 3 is a cross-sectional view along the sectional line B-B in FIG. 1. In this embodiment, as shown in FIG. 3, each of the first fan-shaped rotating pieces 131 has a first corresponding surface R1, and the first corresponding surface R1 is adjacent to the first short edge 131S. On the other hand, each of the second fan-shaped rotating pieces 132 has a second corresponding surface R2, and the second corresponding surface R2 is adjacent to the second short edge 132S.

Figure 4:
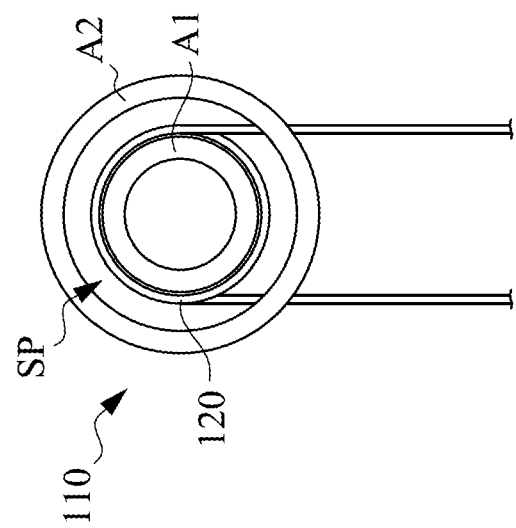
FIG. 4 is a cross-sectional view along the sectional line C-C in FIG. 1.

Reference is made to FIG. 4. FIG. 4 is a cross-sectional view along the sectional line C-C in FIG. 1. In this embodiment, as shown in FIG. 4, the stationary portion 110 has a space SP, a first annular surface A1 and a second annular surface A2. The second annular surface A2 surrounds the first annular surface A1. The second annular surface A2 is separated from the first annular surface A1. The space SP is communicated between the first annular surface A1 and the second annular surface A2. Moreover, the motor rotor 100 includes a coil 120. The coil 120 is located in the space SP.

Figure 5:
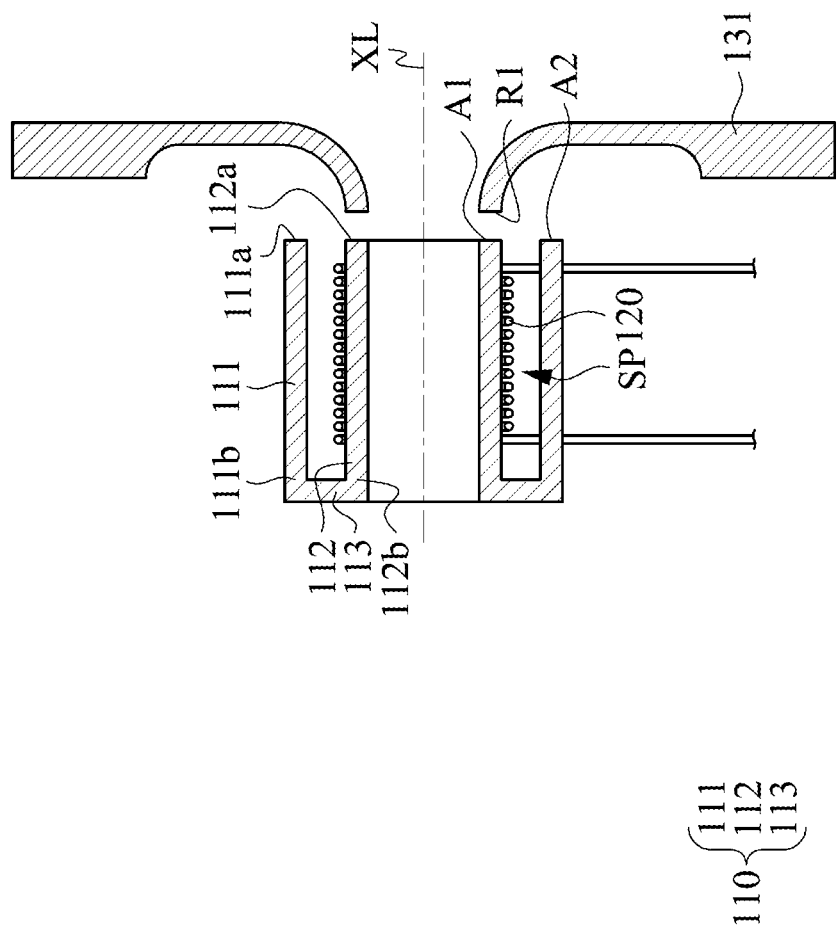
FIG. 5 is a cross-sectional view along the sectional line D-D in FIG. 2.

Reference is made to FIG. 5. FIG. 5 is a cross-sectional view along the sectional line D-D in FIG. 2. To be specific, in this embodiment, as shown in FIG. 5, the stationary portion 110 includes an outer columnar tube 111, an inner columnar tube 112 and a plate 113. The outer columnar tube 111 extends along the axis XL. The outer columnar tube 111 has a first end 111a and a second end 111b opposite to the first end 111a. The second annular surface A2 is located on the first end 111a. The inner columnar tube 112 extends along the axis XL. The inner columnar tube 112 has a third end 112a and a fourth end 112b opposite to the third end 112a. The first annular surface A1 is located on the third end 112a. The inner columnar tube 112 is located inside the outer columnar tube 111. The inner columnar tube 112 and the outer columnar tube 111 define the space SP therebetween. The plate 113 is connected between the second end 111b and the fourth end 112b.

In addition, as shown in FIG. 5, the first corresponding surface R1 of each of the first fan-shaped rotating pieces 131 is separated from the first annular surface A1 of the inner columnar tube 112. Each of the first corresponding surfaces R1 faces to and at least partially aligns with the first annular surface A1.

Figure 6:
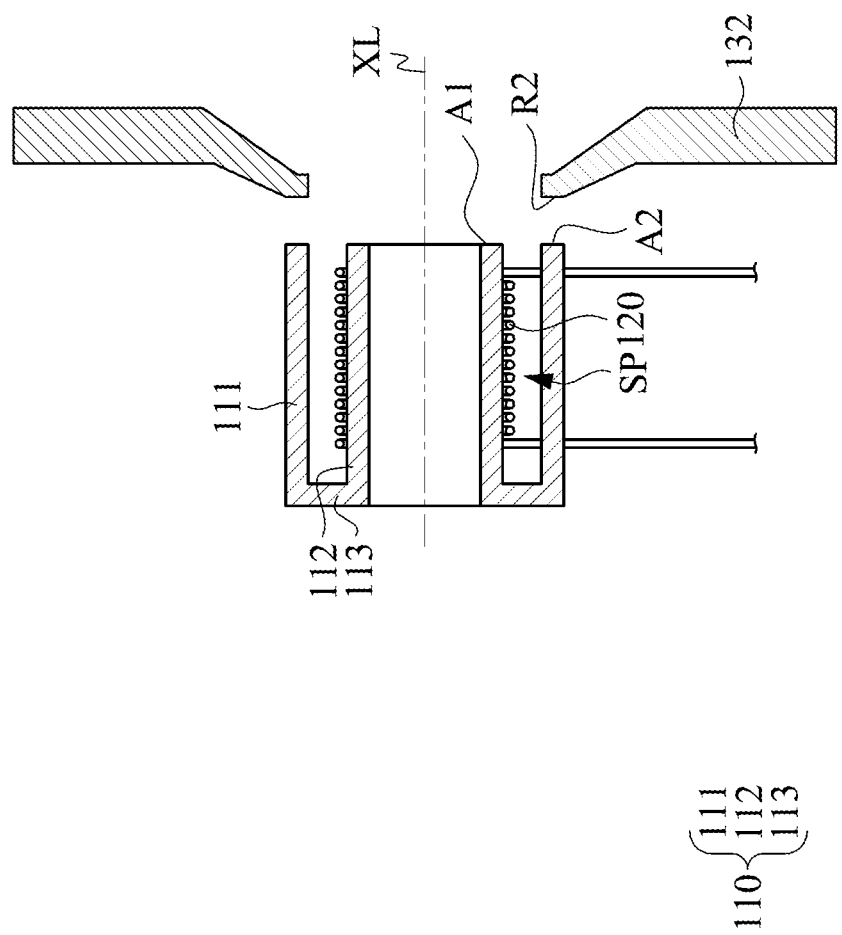
FIG. 6 is a cross-sectional view along the sectional line E-E in FIG. 2.

Reference is made to FIG. 6. FIG. 6 is a cross-sectional view along the sectional line E-E in FIG. 2. In this embodiment, as shown in FIG. 6, the second corresponding surface R2 of each of the second fan-shaped rotating pieces 132 is separated from the second annular surface A2 of the outer columnar tube 111. Each of the second corresponding surfaces R2 faces to and at least partially aligns with the second annular surface A2.

During the operation of the motor rotor 100, the coil 120 is electrically connected and generates a magnetic flux, and the polarities of portions of the magnetic flux on the outer columnar tube 111 and the inner columnar tube 112 are opposite to each other. As mentioned above, since the first corresponding surface R1 of each of the first fan-shaped rotating pieces 131 faces to and at least partially aligns with the first annular surface A1 of the inner columnar tube 112 (as shown in FIG. 5), and the second corresponding surface R2 of each of the second fan-shaped rotating pieces 132 faces to and at least partially aligns with the second annular surface A2 of the outer columnar tube 111 (as shown in FIG. 6), the portions of the magnetic flux of opposite polarities can be respectively guided to the first fan-shaped rotating pieces 131 and the second fan-shaped rotating pieces 132, such that the first fan-shaped rotating pieces 131 and the second fan-shaped rotating pieces 132 possess opposite magnetisms and interact with the stator surrounding the rotating portion 130, causing the rotating portion 130 to rotate relative to the stationary portion 110 about the axis XL. In practice, the opposite polarities are respectively N-pole and S-pole.

Moreover, since the strength of the magnetic flux can be controlled by the electric current applied to the coil 120, when the rotating portion 130 rotates relative to the stationary portion 110 at a low speed, a user can increase the electric current flowing through the coil 120 to enhance the magnetic flux, which also means to increase the magnetisms of the first fan-shaped rotating pieces 131 and the second fan-shaped rotating pieces 132, so as to increase the torque of the rotating portion 130. On the contrary, when the rotating portion 130 rotates relative to the stationary portion 110 at a high speed, a user can decrease the electric current flowing through the coil 120 to reduce the magnetic flux, which also means to decrease the magnetisms of the first fan-shaped rotating pieces 131 and the second fan-shaped rotating pieces 132, so as to increase the rotating speed of the rotating portion 130.

In practical applications, in order to reduce the loss of the magnetic eddy current, the stationary portion 110, the first fan-shaped rotating pieces 131 and the second fan-shaped rotating pieces 132 can be respectively formed by stacking a plurality of thin sheets, and the thin sheets are bonded by insulating glue. For example, the thin sheets can be silicon steel sheets. However, this does not intend to limit the present disclosure.

Figure 7:
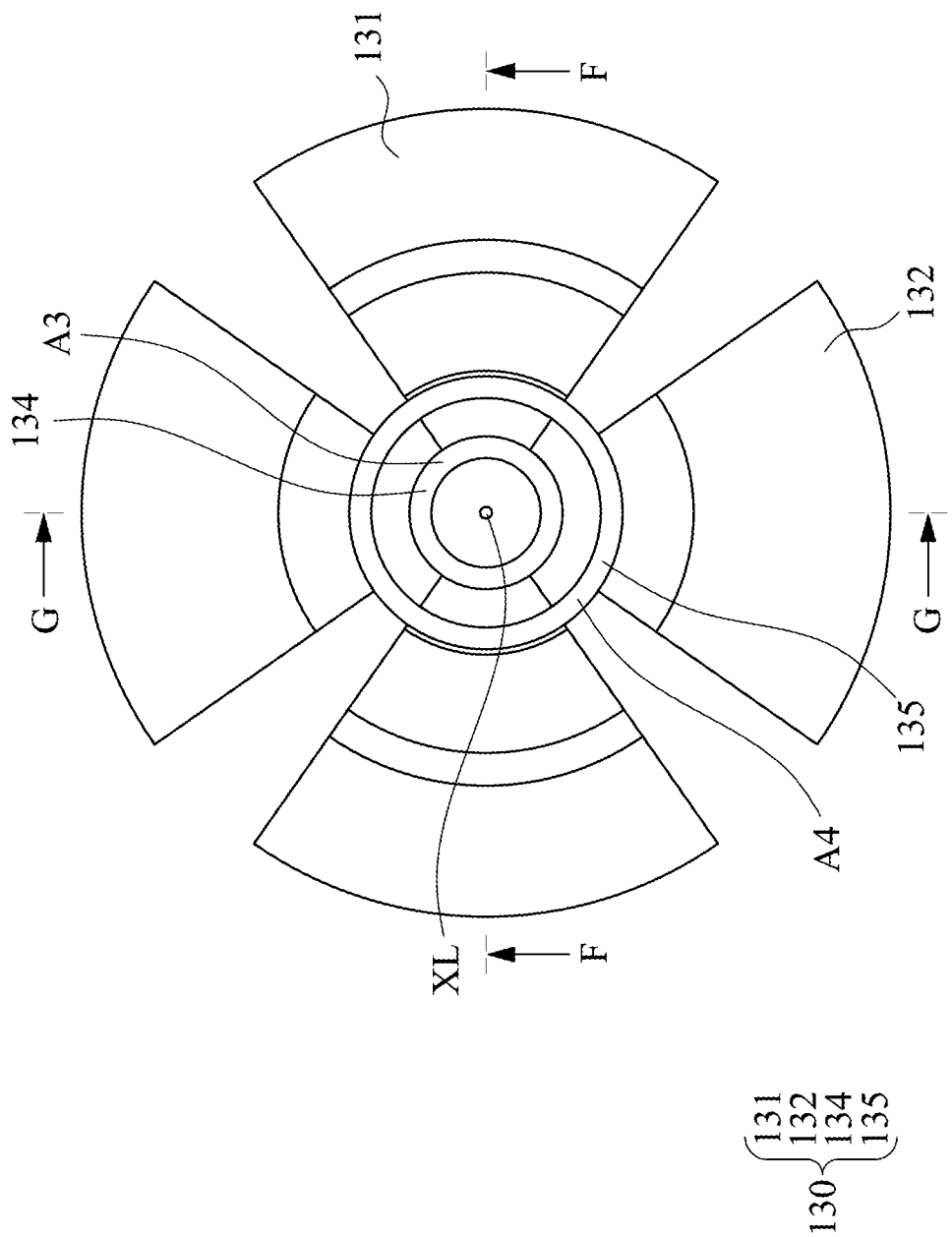
FIG. 7 is a front view of a rotating portion according to another embodiment of the present disclosure.
Figure 8:
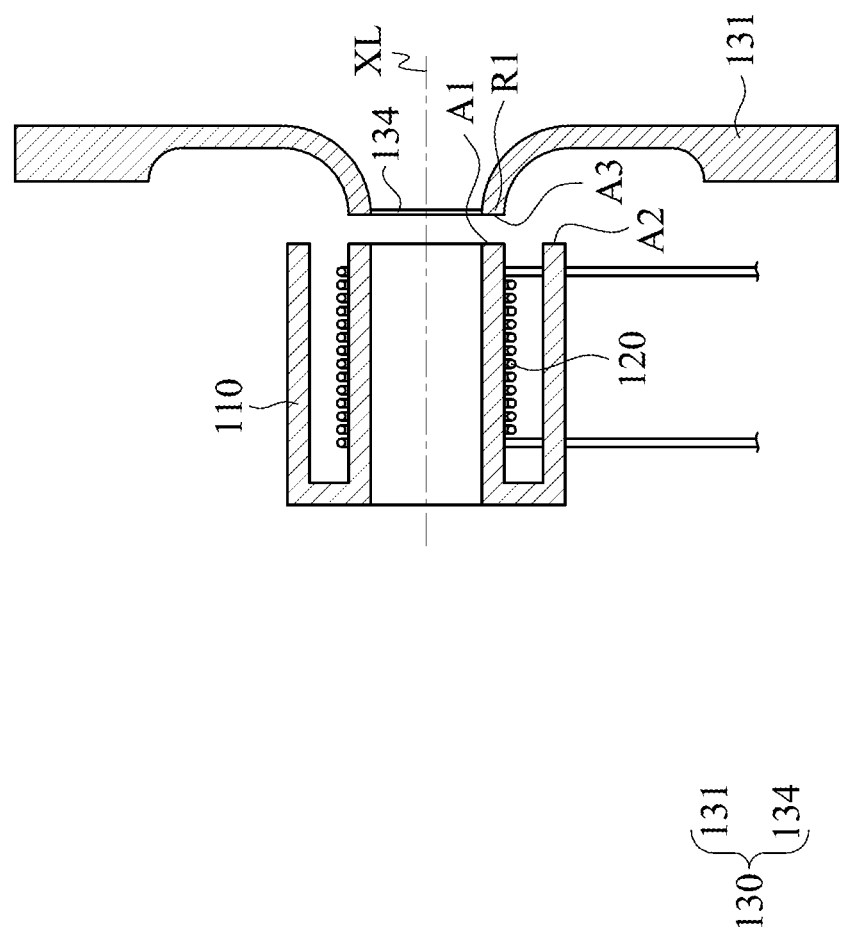
FIG. 8 is a cross-sectional view along the sectional line F-F in FIG. 7.

Reference is made to FIGS. 7-8. FIG. 7 is a front view of a rotating portion 130 according to another embodiment of the present disclosure. For the sake of drawing simplification, the non-magnetic element 133 is not shown in FIG. 7. FIG. 8 is a cross-sectional view along the sectional line F-F in FIG. 7. For the sake of drawing simplification, the stationary portion 110 and the coil 120 are also shown in FIG. 8. In this embodiment, as shown in FIGS. 7-8, the rotating portion 130 further includes a first annular piece 134. The first annular piece 134 aligns with the first annular surface A1. The first corresponding surface R1 of each of the first fan-shaped rotating pieces 131 is connected to a side of the first annular piece 134 away from the first annular surface A1.

Furthermore, the first annular piece 134 has a third annular surface A3. The third annular surface A3 faces to the first annular surface A1 of the inner columnar tube 112. The third annular surface A3 is separated from the first annular surface A1. To be specific, an area of the third annular surface A3 is equal to an area of the first annular surface A1.

Figure 9:
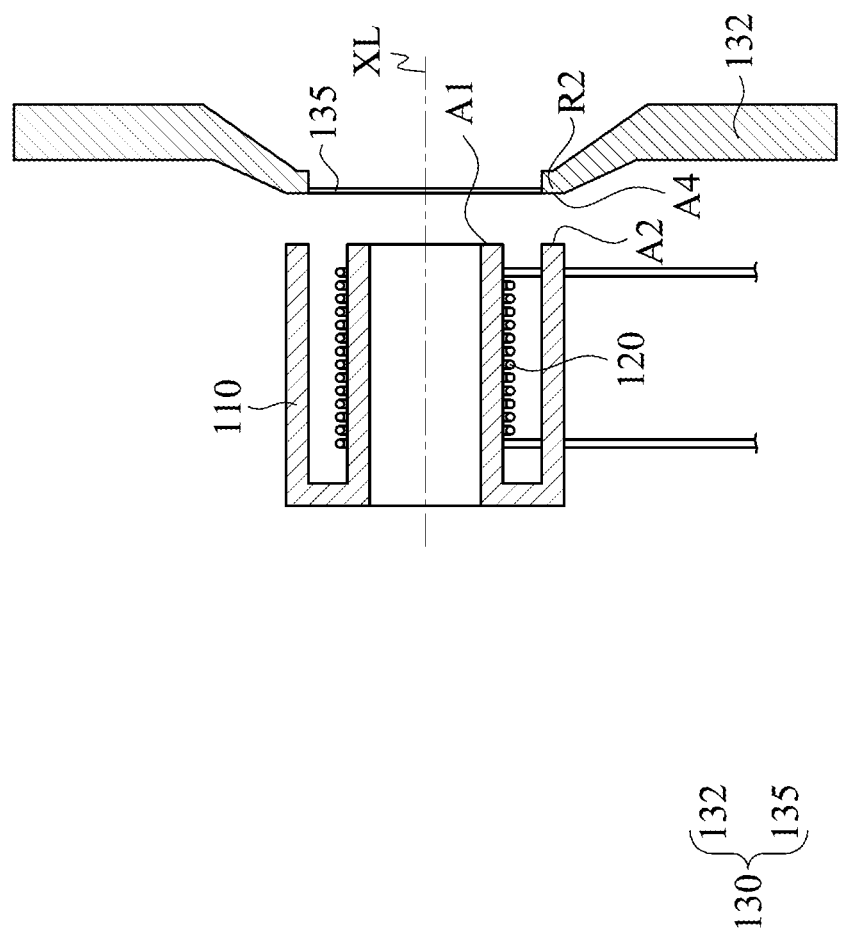
FIG. 9 is a cross-sectional view along the sectional line G-G in FIG. 7.

Reference is made to FIGS. 7 and 9. FIG. 9 is a cross-sectional view along the sectional line G-G in FIG. 7. For the sake of drawing simplification, the stationary portion 110 and the coil 120 are also shown in FIG. 9. In this embodiment, as shown in FIGS. 7 and 9, the rotating portion 130 further includes a second annular piece 135. The second annular piece 135 surrounds the first annular piece 134 and aligns with the second annular surface A2. The second corresponding surface R2 of each of the second fan-shaped rotating pieces 132 is connected to a side of the second annular piece 135 away from the second annular surface A2.

Furthermore, the second annular piece 135 has a fourth annular surface A4. The fourth annular surface A4 faces to the second annular surface A2 of the outer columnar tube 111. The fourth annular surface A4 is separated from the second annular surface A2. To be specific, an area of the fourth annular surface A4 is equal to an area of the second annular surface A2.

Moreover, in practical applications, the third annular surface A3 of the first annular piece 134 and the fourth annular surface A4 of the second annular piece 135 are substantially coplanar with each other. This means the third annular surface A3 and the fourth annular surface A4 are located on the same plane.

In conclusion, the aforementioned embodiments of the present disclosure have at least the following advantages:

(1) Since the first corresponding surface of each of the first fan-shaped rotating pieces faces to and at least partially aligns with the first annular surface of the inner columnar tube, and the second corresponding surface of each of the second fan-shaped rotating pieces faces to and at least partially aligns with the second annular surface of the outer columnar tube, the portions of the magnetic flux of opposite polarities can be respectively guided to the first fan-shaped rotating pieces and the second fan-shaped rotating pieces, such that the first fan-shaped rotating pieces and the second fan-shaped rotating pieces possess opposite magnetisms and interact with the stator surrounding the rotating portion, causing the rotating portion to rotate relative to the stationary portion about the axis.

(2) Since the strength of the magnetic flux can be controlled by the electric current applied to the coil, when the rotating portion rotates relative to the stationary portion at a low speed, a user can increase the electric current flowing through the coil to enhance the magnetic flux, which also means to increase the magnetisms of the first fan-shaped rotating pieces and the second fan-shaped rotating pieces, so as to increase the torque of the rotating portion. On the contrary, when the rotating portion rotates relative to the stationary portion at a high speed, a user can decrease the electric current flowing through the coil to reduce the magnetic flux, which also means to decrease the magnetisms of the first fan-shaped rotating pieces and the second fan-shaped rotating pieces, so as to increase the rotating speed of the rotating portion.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A motor, comprising:
   a stationary portion having a space, a first annular surface and a second annular surface, the second annular surface surrounding and being separated from the first annular surface, the space being communicated between the first annular surface and the second annular surface;
   a coil at least partially located in the space; and
   a rotating portion configured to rotate about an axis relative to the stationary portion, the rotating portion comprising:
      a plurality of first fan-shaped rotating pieces, each of the first fan-shaped rotating pieces having a first corresponding surface, a first short edge and a first long edge opposite to the first short edge, the first short edge being closer to the axis than the first long edge to the axis, the first corresponding surface being adjacent to the first short edge, the first corresponding surface facing to and at least partially aligning with the first annular surface;
      a plurality of second fan-shaped rotating pieces alternately arranged with the first fan-shaped rotating pieces around the axis, each of the second fan-shaped rotating pieces having a second corresponding surface, a second short edge and a second long edge opposite to the second short edge, the second short edge being closer to the axis than the second long edge to the axis, the second corresponding surface being adjacent to the second short edge, the second corresponding surface facing to and at least partially aligning with the second annular surface; and a first annular piece aligning with the first annular surface, the first corresponding faces being connected to a side of the first annular piece away from the first annular surface.

2. The motor of claim 1, wherein the first fan-shaped rotating pieces and the second fan-shaped rotating pieces are separated from each other.

3. The motor of claim 1, wherein the first corresponding surfaces are separated from the first annular surface, the second corresponding surfaces are separated from the second annular surface.

4. The motor of claim 1, wherein each of the first long edges has a first length, each of the second long edges has a second length, the first length is equal to the second length.

5. The motor of claim 1, wherein the rotating portion further comprises:
   a non-magnetic element connected with the first fan-shaped rotating pieces and the second fan-shaped rotating pieces.

6. The motor of claim 1, wherein the stationary portion comprises:
   an outer columnar tube extending along the axis and having a first end and a second end opposite to the first end, the second annular surface is located on the first end;
   an inner columnar tube extending along the axis and having a third end and a fourth end opposite to the third end, the first annular surface is located on the third end, the inner columnar tube is located inside the outer columnar tube, the inner columnar tube and the outer columnar tube define the space therebetween; and
   a plate connected between the second end and the fourth end.

7. The motor of claim 1, wherein the first annular piece has a third annular surface, the third annular surface faces to and is separated from the first annular surface, an area of the third annular surface is equal to an area of the first annular surface.

8. The motor of claim 1, wherein the rotating portion further comprises:
   a second annular piece surrounding the first annular piece and aligning with the second annular surface, the second corresponding faces are connected to a side of the second annular piece away from the second annular surface.

9. The motor of claim 8, wherein the second annular piece has a fourth annular surface, the fourth annular surface faces to and is separated from the second annular surface, an area of the fourth annular surface is equal to an area of the second annular surface.

10. A motor, comprising:
    a stationary portion having a space, a first annular surface and a second annular surface, the second annular surface surrounding and being separated from the first annular surface, the space being communicated between the first annular surface and the second annular surface;
    a coil at least partially located in the space; and
    a rotating portion configured to rotate about an axis relative to the stationary portion, the rotating portion comprising:
       a plurality of first fan-shaped rotating pieces respectively having a first corresponding surface facing to and at least partially aligning with the first annular surface;
       a plurality of second fan-shaped rotating pieces alternately arranged with the first fan-shaped rotating pieces around the axis, each of the second fan-shaped rotating pieces having a second corresponding surface facing to and at least partially aligning with the second annular surface, a quantity of the first fan-shaped rotating pieces being equal to a quantity of the second fan-shaped rotating pieces; and
       an annular piece aligning with the first annular surface, the first corresponding faces being connected to a side of the annular piece away from the first annular surface.

11. The motor of claim 10, wherein each of the first fan-shaped rotating pieces has a first short edge and a first long edge opposite to the first short edge, the first short edge is closer to the axis than the first long edge to the axis, each of the first corresponding surfaces is adjacent to a corresponding one of the first short edges, each of the second fan-shaped rotating pieces has a second short edge and a second long edge opposite to the second short edge, the second short edge is closer to the axis than the second long edge to the axis, each of the second corresponding surfaces is adjacent to a corresponding one of the second short edges, the first long edges and the second long edges are located on a same circular locus.

12. The motor of claim 11, wherein each of the first long edges has a first length, each of the second long edges has a second length, the first length is equal to the second length.

13. The motor of claim 10, wherein the first fan-shaped rotating pieces and the second fan-shaped rotating pieces are separated from each other.

14. The motor of claim 10, wherein the first corresponding surfaces are separated from the first annular surface, the second corresponding surfaces are separated from the second annular surface.

15. The motor of claim 10, wherein the rotating portion further comprises:
    a non-magnetic element connected with the first fan-shaped rotating pieces and the second fan-shaped rotating pieces.

16. The motor of claim 10, wherein the stationary portion comprises:
    an outer columnar tube extending along the axis and having a first end and a second end opposite to the first end, the second annular surface is located on the first end;
    an inner columnar tube extending along the axis and having a third end and a fourth end opposite to the third end, the first annular surface is located on the third end, the inner columnar tube is located inside the outer columnar tube, the inner columnar tube and the outer columnar tube define the space therebetween, the coil at least partially winds around the inner columnar tube; and
    a plate connected between the second end and the fourth end.

* * * * *